United States Patent [19]
Ward

[11] Patent Number: 4,909,725
[45] Date of Patent: Mar. 20, 1990

[54] RUNNER SWITCH FOR AN INJECTION MOLDING MACHINE

[76] Inventor: Joseph W. Ward, 1319 Sauk Ave., P.O. Box 94, Baraboo, Wis.

[21] Appl. No.: 261,571

[22] Filed: Oct. 25, 1988

[51] Int. Cl.⁴ .............................................. B29C 45/30
[52] U.S. Cl. .............................. 425/562; 264/328.12; 425/572; 425/588
[58] Field of Search ............... 425/161, 182, 185, 190, 425/562, 572, 588; 264/328.12

[56] References Cited

U.S. PATENT DOCUMENTS 4,242,073 12/1980 Tsuchiya et al. .................... 425/572
4,708,314 11/1987 Kuhling ................................ 425/190

Primary Examiner—Jay H. Woo
Assistant Examiner—Timothy W. Heitbrink
Attorney, Agent, or Firm—Carl E. Gulbrandsen; James A. Gabala

[57] ABSTRACT

An apparatus for switching runners in an injection molding system of the type having cavities which are joined by runners, the apparatus having a bushing member which has a top end, a bottom end and a central aperture, the bottom end having at least two outwardly disposed runner extensions which are in flow communication with the central aperture and the cavity runners, a bushing insert which is sealingly and rotatably fitted within the central aperture of the bushing member and which has a bottom end having therein a runner extension device which is in flow communication with one of the runner extensions in the bushing member when the bushing insert is in one position and which is in flow communication with another runner extension in the bushing member when the bushing insert is in a second position; and an indexing member carried by the bushing insert and the bushing member for establishing a plurality of predetermined relative positions of the bushing insert relative to the bushing member.

29 Claims, 2 Drawing Sheets

U.S. Patent    Mar. 20, 1990    Sheet 1 of 2    4,909,725
FIG. 1 (PRIOR ART)
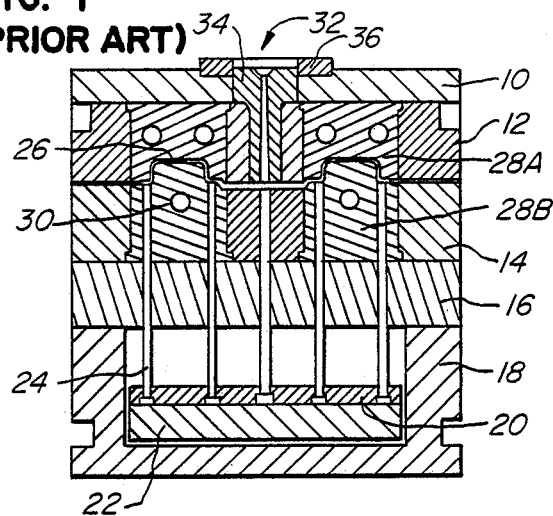
FIG. 2A (PRIOR ART)
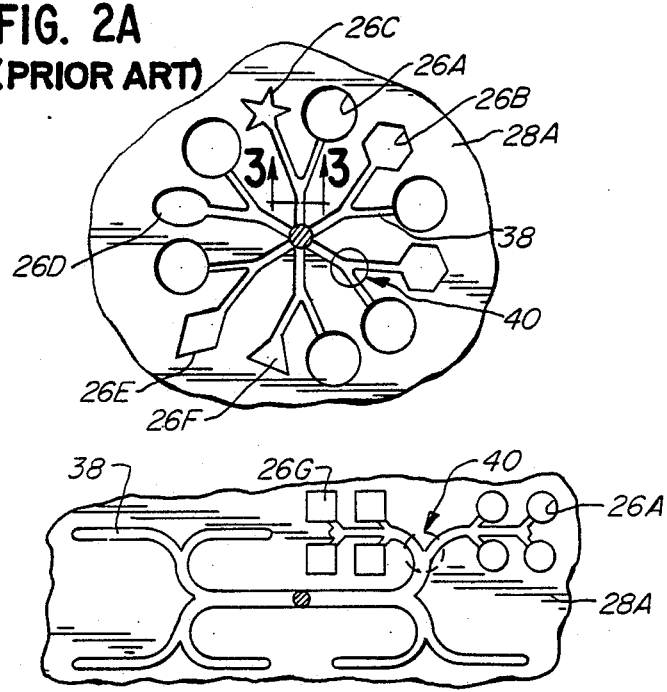
FIG. 2B (PRIOR ART)
FIG. 2C (PRIOR ART)
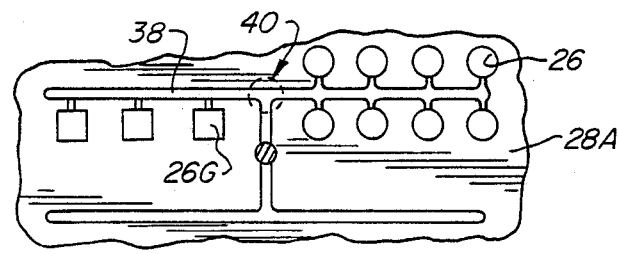
FIG. 5
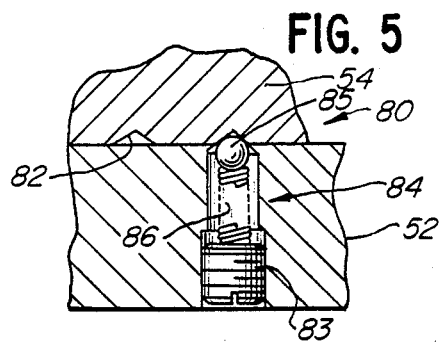
FIG. 3A
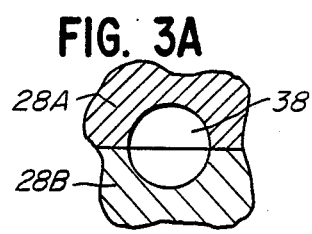
FIG. 3B
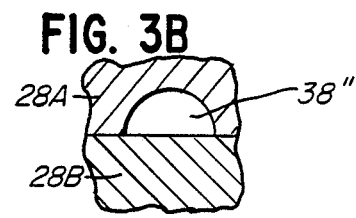
FIG. 3C
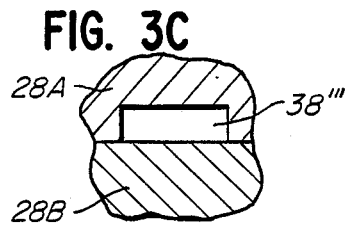
FIG. 4
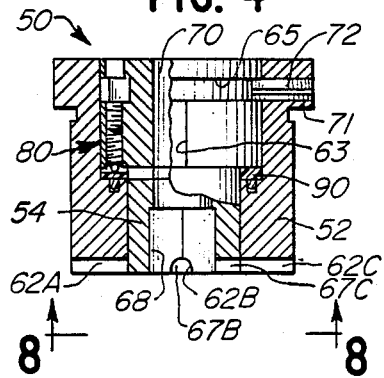

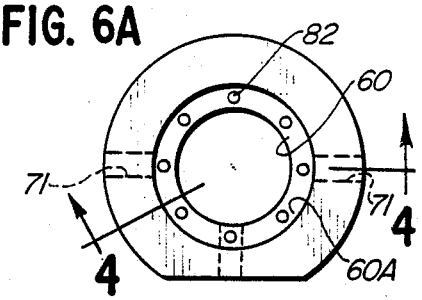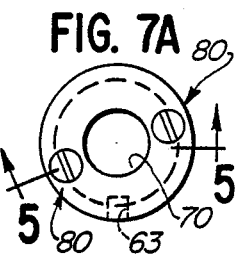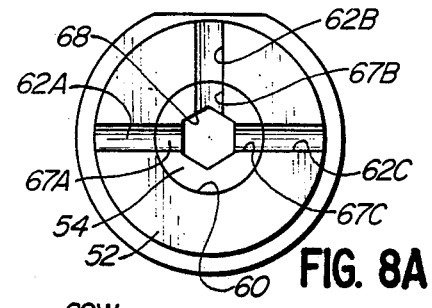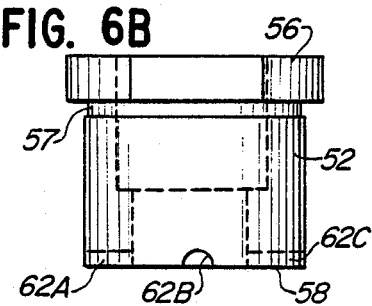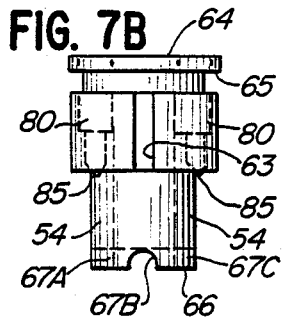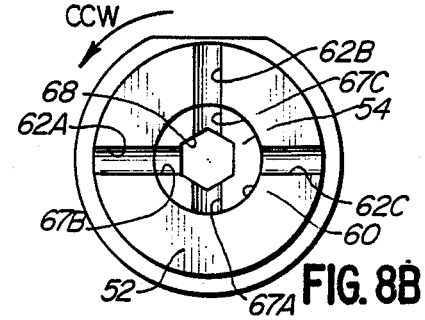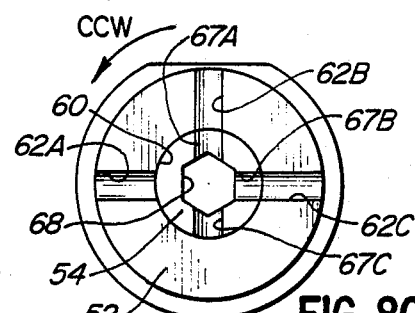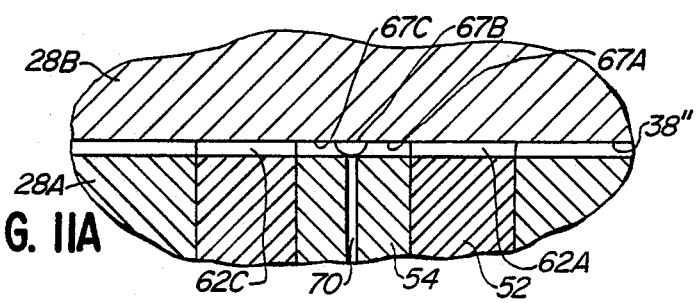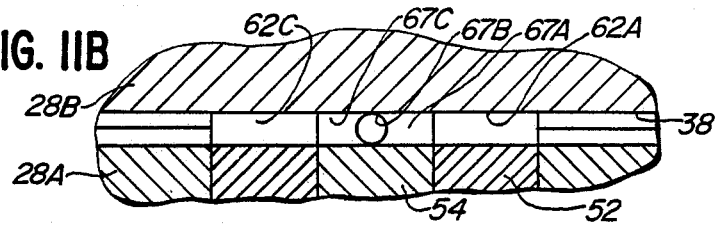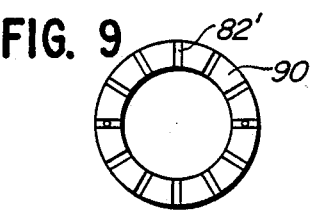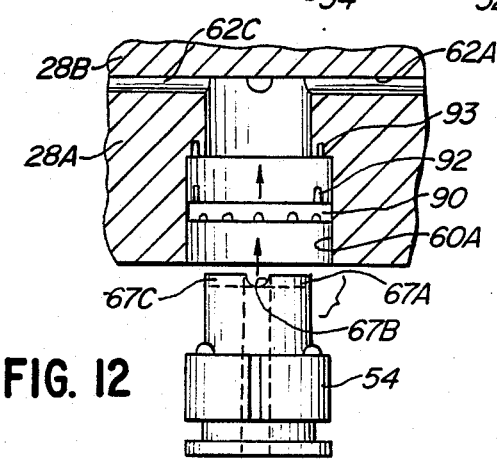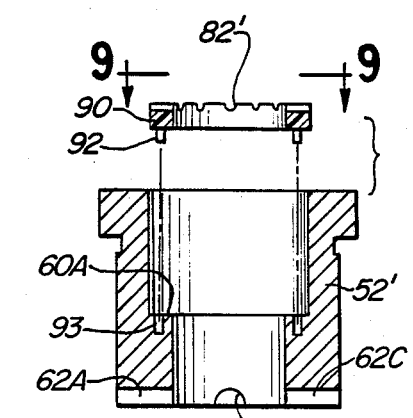

RUNNER SWITCH FOR AN INJECTION MOLDING MACHINE

TECHNICAL FIELD

This invention relates to the general subject matter of plastics and injection molding and, in particular, to the means and methods used to direct the flow of molten plastic into the cavities which form a plastic part.

BACKGROUND OF THE INVENTION

Injection molding consists of heating and homogenizing plastic granules in a cylinder until they are sufficiently fluid to allow for pressure injection into a relatively cold mold where they solidify and take the shape of the mold cavity. The major advantages of the injection-molding process are the speed of production, minimal requirements for post molding operations and simultaneous multi-part molding. One disadvantage of the injection molding process is that the molds are generally expensive to manufacture.

In certain cases, it is desired that certain impressions in a multi-impression injection tool or mold should be "shut-off". This can arise if certain impressions are found to be defective or not capable of molding satisfactorily. More frequently, however, this requirement occurs when the tool comprises a set of dissimilar components and it is desired to make certain pieces and not others (e.g., components consisting of either right or left-hand pieces of an assembly, etc.). If the cut-off is to be semi-permanent, it is the practice to weld up the runner or runner gate. However, if the cut-off is temporary, merely to afford a selection in production or a change in quantity, the runner system can be designed to accommodate a plug that can be turned so that the runner may be allowed to continue or be shut-off. Sometimes two interchangeable plugs are employed, one being blank for shutting off the runner and the other being shaped to continue the runner. Commonly the mold (or mold halves) have to be removed from the molding machine and disassembled to change these plugs which is very costly and time consuming. (See "Injection-Mould Design Fundamentals", by Glanvill and Denton, Industrial Press Inc., 1965, N.Y., p.122).

What is needed is a means and method by which the flow to runners can be switched or cutoff in a simple and straight forward manner without having to disassemble mold halves and without having to use highly skilled personnel. It would be especially desirable to have the means for switching runners to be versatile and interchangeable amongst various mold components. Such a means of switching runners would lead to increased productivity and utilization of multi-impression molds at a low cost. The injection molding industry would welcome such an approach, especially if the method or apparatus could be easily modified or interchanged by the end user.

SUMMARY OF THE INVENTION

In accordance with the present invention an apparatus is disclosed for switching runners in an injection molding system of the type where an upper mold half and lower mold half cooperate together to form at least two cavities which are in flow communication with runners. Specifically, the apparatus comprises: a relatively fixed bushing member which is carried by one of the mold halves which has its top end and its bottom end in flow communication with each other through a central bore, and which has its bottom end having at least two outwardly disposed runner extensions which are in flow communication with the central bore and at least two runners in the mold halves; a bushing insert which is sealingly and rotatably fitted within the central bore of the bushing member and which has a bottom end having therein means for establishing flow communication across the runner extensions in the bushing member when the bushing insert is in one position, and for cutting off flow communication when the bushing insert is in a second position; and indexing means carried by the bushing insert and the bushing member for establishing a plurality of predetermined relative positions of the bushing insert relative to the bushing member.

Preferably, the indexing means comprises an annular ring which is carried by the bushing member and which has a plurality of depressions which are aligned to receive a protrusion carried by the bushing insert. Preferably, the indexing means comprises an annular non-metallic ring which is carried by the bushing member and which has a plurality of depressions so as to define a plurality of predetermined relative positions.

The apparatus that is the subject of the present invention can be adapted to be used in a variety of ways. For example, the bushing member can be an integral part of a mold half and the bushing insert can be produced and sold with the indexing means. Moreover, the bushing insert can be manufactured without a specific arrangement of runner extensions whereby the user is free to modify it to fit the particular situation or unique characteristics of the injection mold.

Numerous other advantages and features of the present invention will become readily apparent from the following detailed description of the invention, the embodiments described therein, from the claims, and from the accompanying drawings.

BRIEF DESCRIPTION OF THE DRAWINGS

FIG. 1 is a cross-sectional, side, elevational view of a typical two-piece injection molding system;

FIGS. 2A, 2B, and 2C are plan views illustrating arrangements by which mold cavities are interconnected by runners to a central supply;

FIGS. 3A, 3B and 3C are partial, cross-sectional views of typical runners;

FIG. 4 is a partial, cross-sectional view of the runner switch that is the subject of the present invention;

FIG. 5 is an enlarged, partial, cross-sectional view of one embodiment of the indexing means;

FIGS. 6A and 6B are top and side views of the base member of the runner switch shown in FIG. 4;

FIGS. 7A and 7B are top and side views of the switch member of the runner switch shown in FIG. 4;

FIGS. 8A, 8B and 8C are bottom views of the runner switch with the switch member shown in three different positions relative to the base member;

FIG. 9 is a top view of one embodiment of the indexing means that is the subject of the present invention;

FIG. 10 is a partial assembly drawing illustrating the manner in which the indexing ring of FIG. 9 is positioned relative to the base member of FIGS. 6A and 6B;

FIGS. 11A and 11B are enlarged, partial, cross-section, side views to illustrate the manner in which two embodiments of the runner switch interface with two mold halves; and FIG. 12 is a partial, cross-sectional, side assembly drawing illustrating the manner in which the indexing means of FIG. 9 and the switch member of FIG. 7 can be used in a mold half without a separate base member.

DETAILED DESCRIPTION OF THE INVENTION

While this invention is susceptible of embodiment in many different forms, there is shown in the drawings and will herein be described in detail several specific embodiments of the invention. It should be understood, however, that the present disclosure is to be considered as an exemplification of the principles of the invention and is not intended to limit the invention to the specific embodiments illustrated.

Before describing the subject matter of the invention, the environment of the invention will be described so that the novel features and aspects of the invention will be better understood.

General

Turning to FIG. 1, the components of a typical two-piece injection molding system are illustrated. Specifically, there is illustrated a top clamping plate 10, a front cavity plate 12, a rear cavity plate 14, a support plate 16, an ejector housing 18, an ejector retainer plate 20, an ejector plate 22, and a plurality of ejector pins 24. Cavities 26 are machined into mold inserts 28A and 28B which are retained by the cavity plates 12 and 14. The function of the mold cavities 26 is to shape the plastic part and to confine the molten plastic material under pressure until it is sufficiently rigid to permit ejection. The mold must also provide for rapid and efficient transfer of heat. Therefore, mold inserts 28A and 28B usually contain channels 30 for cooling. Plastic is injected (see arrow 32) through a sprue bushing 34 which is held in place by a locating ring 36. The plastic compound is plastisized in an injection machine and then forced to flow through the sprue bushing 34, through runners 38 (see FIGS. 2A, 2B, and 2C), and then to the mold cavities 26.

One purpose of the runners is to convey hot molding material from the sprue bushing 34 to the mold cavity 26. Runners 38 can have a circular (see FIG. 3A), semi-circular (see FIG. 3B), or a rectangular (see FIG. 3C), or even a trapezoidal cross-section. Full round runners (FIG. 3A) are preferred as they have minimum surface-to-volume ratio, which minimizes heat loss and pressure drop. Trapezoidal runners work well and permit the runners system to be designed on one side of the mold. This type of runner is commonly used in three-plate molds where the full round runner may not release properly, and at the parting line in molds with sliding action where the full round runner would interfere with sliding movement.

Runners can have branches (see FIG. 2A, 2B, and 2C). The main supply branch is referred to as the "main runner" and the secondary or auxiliary branches are referred to as "auxiliary runners" or "distribution runners". The auxiliary runners are smaller than the main runners, since less volume flows through them, and since it is economically desirable to use minimum material in the runners.

Those points or positions 40 in the mold runner system, wherein main and auxiliary runners come together define a "node". Nodes are convenient points for cutting off flow to one or more of the mold cavities 26. This is one purpose of the runner switch 50 that is the subject of the present invention.

Runner Switch

Turning to FIG. 4, the runner switch 50 comprises, in one embodiment, a base member 52 and a switch member 54.

The base member 52 has a top end 56 (see FIGS. 6A and 6B), a bottom end 58, and a central aperture or through bore 60. The upper or top end 56 of the base member 52 has a larger diameter than the bottom end 58. Between the bottom end and the top end is a circumferential groove 57 which is adapted to hold the base member in place on a mold insert. The bottom end 58 of the base member 52, in this particular embodiment, has three runner extensions 62A, 62B and 62C (see FIGS. 8A, 8B and 8C), which are open to the central aperture or bore 60.

Turning to the switch member (see FIGS. 7A and 7B), the switch member 54 is adapted to sealingly and rotatably fit within the bore 60 of the base member 52 (see FIG. 5). The switch member 54 has a top side 64 and a bottom side 66. Here, the bottom side 66 lies generally in the same plane as the bottom end 58 of the base member 52, when the two are joined together (see FIGS. 4, 11A and 11B). The bottom side 66 has three runner extensions 67A, 67B and 67C (see FIGS. 8A, 8B and 8C) which are aligned to the runner extensions 62A, 62B and 62C in the base member 52. Thus, in the arrangements shown in FIG. 8A, wherein the three runner extensions 62A, 62B, and 62C in the base member 52 are aligned with the three runner extensions 67A, 67B, and 67C in the switch member 54, fluid entering into runner extension 62B is free to pass to runner extension 62A and 62C.

When the switch member 54 is turned counter clockwise (accordingly to the orientation of FIG. 8B) fluid entering runner extension 62B can only flow to runner extension 62A. Similarly, when the switch member is rotated clockwise from the position of FIG. 8B so as to assume the position of 8C, fluid entering runner extension 62B can flow only to runner extension 62C. In a similar fashion, the switch member 54 can be rotated an additional 90 degrees from the position shown in FIG. 8C, wherein fluid entering runner extension 62B would be cut off from the two other runner extension 62A and 62C in the base member 52.

The bottom side 66 of the switch member 54, in this particular embodiment, is provided with axial aperture 68, whereby an allen wrench may be used to rotate switch member relative to the base member 52. The switch member can also be provided with a central bore or aperture 70 to accept an ejector pin 24 (see FIG. 1). The top side 64 of the switch member 54 has a larger diameter than its lower end so as to fit atop the counterbore surface 60A of the base member 52. The top side 64 of the switch member 54 is also provided with an annular groove 65 and a longitudinal or axial groove 63. The top end 56 of the base member 52 has at least one aperture 71 which carries a pin 72. This pin is adapted to fit within the longitudinal groove 63 and the circumferential groove 65 of the switch member 54. In other words, the switch member 54 is axially locked in place relative to the base member 52 by aligning the longitudinal groove 63 with the locking pin 72, driving the two members together until their lower ends coincide, and then twisting or turning the two members relative to each other, whereby the locking pin fits within circumferential groove 65.

To index or establish fixed relative positions of the switch member 54 relative to the base member 52, a means 80, carried by at least one of the two members, is provided for establishing a plurality of predetermined relative positions. These positions include the positions illustrated in FIGS. 8A, 8B and 8C. Specifically, in the embodiment illustrated in the drawings, the indexing means 80 comprises a plurality of indents or indentions 82 (see FIG. 6A) or projections which are carried or defined or formed in the base member 52 and two spring loaded members or compliant 84 (see FIGS. 5 and 7B) carried by the switch member. Each spring loaded member 84 comprises a ball bearing 85, a spring 86, and a grub screw 87. The ball bearing 85 is pushed in when the flat surface of the base member rolls across the switch member.

In some situations, it may be more appropriate to use the indexing means of FIGS. 9 and 10. Specifically, in this embodiment, the indents 82', which are established in the base member 52', are defined by an annular nylon ring 90. The nylon ring has two oppositely disposed pins 92 which fit within two apertures 93 in the base member, and a series of depressions opposite the pins. These depressions are aligned to receive the spring loaded ball bearing 85 which project from the switch member. In this manner, a variety of spacings or angular positions can be easily established in the same base member 52'. In other words, by a wide variety of base members and switch members can be mated and a wide range of predetermined positions can be established. For that matter, by using the ring 90 and a relative switch member with runner extensions already formed therein or formed by the user after purchase, the switch member can be easily adapted into a mold half without the need to use or insert a separate base member into a mold half (see FIG. 12). Moreover, the ring indentations can be used to define permitted orientations of the base member and the switch member.

Turning now to FIGS. 11A and 11B, two embodiments of a runner switch are illustrated and the manner in which they interface with or are a part of the mold inserts 28A and 28B. In FIG. 11A, the runner switch 50 comprises a base member 52 and a switch member 54, as previously described. Here the runners 38" and runner extensions 62C, 67C, 62B, 62A, 67A have a semicircular cross section (see FIG. 3B). In FIG. 11B, the runners 38 have a circular cross section (see FIG. 3A). Note that in FIG. 11B the switch member 54 is not provided with an ejector aperture 70. This should be contrasted with FIG. 12 where the base member 52 is formed in the mold insert itself; thus, only the switch member 52 and indexing ring 90 need be inserted.

From the foregoing description, it will be observed that numerous variations and modifications may be affected without departing from the true spirit and scope of the novel concept of the invention. For example, in the embodiment illustrated in FIG. 4, the spring loaded members or compliant members 84 can be made part of the base member and the indents or detents 82 provided in the corresponding surface of the switch member. Similarly, the runner extensions in the base member and the switch member need not necessarily be at the very end of the members so as to be exposed to the exterior. It is, of course, intended to cover by the appended claims all such modifications as fall within the scope of the claims.

I claim:
1. Apparatus, comprising:
(a) a base member having a top end, a bottom end and a central aperture extending between said top end and said bottom end, said bottom end having therein at least two outwardly disposed runner extensions in communication with said central aperture said central aperture in said base member being formed by counterboring said base member to have a larger diameter at said top end and thereby forming a seating surface which is located intermediate said top end and said bottom end;
(b) a switch member sealingly and rotatably fitting within said central aperture of said base member and having a top side and a bottom side, said bottom side lying generally in the same plane as said bottom end when said switch member is fitted within said base member, said bottom side having therein runner extension means for establishing flow communication between said two runner extensions in said base member when said switch member is in one position relative to said base member and for cutting off flow communication between said two runner extensions in said base member when said switch member is in a second position relative to said base member; and
(c) indexing means, carried by at least one of said members, for establishing a plurality of predetermined relative positions of said base member relative to said switch member, said predetermined positions including said first position and said second position, said indexing means comprising a projection carried by said switch member and a ring removably carried by said sealing surface of said base member and having therein a plurality of apertures which are adapted to receive said projection carried by said switch member.

2. The apparatus of claim 1, wherein said switch member includes a central opening, passing from said top side to said bottom side of said switch member, for receiving means to remove solidified material.

3. The apparatus of claim 1, wherein said switch member includes an opening for receiving means to rotate said switch member relative to said base member.

4. The apparatus of claim 1, wherein said switch member includes: a central opening, passing from said top side to said bottom side of said switch member, for receiving means to remove solidified plastic material adjacent said bottom side of said switch member, and for receiving means to rotate said switch member relative to said base member.

5. In an injection molding system having an upper mold half and a lower mold half which are joined together along two flat faces and which cooperate together to form at least two cavities which are in flow communication with runners located in said flat faces, apparatus for directing the supply of plastic to the runners, comprising:
(a) a bushing member which is carried by one of said mold halves, which has a top end and a bottom end, and which has both ends in flow communication with each other through a central aperture, said bottom end having a generally flat surface in which are formed at least two outwardly disposed runner extensions which are in flow communication with said central aperture and the runners in said mold halves;

(b) a bushing insert sealingly and rotatably fitting within said central aperture of said bushing member and having a top side and a bottom side which are joined together by a removal port, said bottom side having a generally flat surface in which is formed one runner extension which is in flow communication with one of said runner extensions in said bushing member when said bushing insert is in one position relative to said bushing member, said flat surface of said bottom side having formed therein a second runner extension which is in flow communication and with another runner extension in said bushing member when said bushing member is in a second position; and (c) indexing means carried by said bushing insert and said bushing member for establishing a plurality of predetermined relative positions of said bushing insert relative to said bushing member, said predetermined positions including said first and said second positions.

6. In an injection molding system where an upper mold half and a lower mold half cooperate together to form at least two cavities which are in flow communication with runners, apparatus for directing the supply of plastic to the runners comprising:

(a) a bushing member which is carried by one of said mold halves, which has a top end and a bottom end, and which has both ends in flow communication with each other through a central aperture, said bottom end having therein at least two outwardly disposed runner extensions which are in flow communication with said central aperture and the runners in said mold halves;

(b) a bushing insert sealingly and rotatably fitting within said central aperture of said bushing member and having a top side and a bottom side which are joined together by a removal port, said bottom side having therein one runner extension which is in flow communication with one of said runner extensions in said bushing member when said bushing insert is in one position relative to said bushing member, and having therein a second runner extension which is in flow communication and with another runner extension in said bushing member when said bushing member is in a second position; and (c) indexing means carried by said bushing insert and said bushing member for establishing a plurality of predetermined relative positions of said bushing insert relative to said bushing member, said predetermined positions including said first and said second positions, said indexing means comprising an indexing ring carried by one of said bushing inserts and said bushing member and a spring loaded pin which moves in a direction towards and away from said flat faces of said mold halves and which is carried by the other of said bushing members and said bushing insert, said ring defining therein a plurality of detentes which are adapted to fit said pin.

7. The apparatus of claim 6, wherein said bushing insert member includes a central opening, passing from said top side to said bottom side of said bushing insert, for receiving means to remove solidified plastic material and for receiving means to rotate said bushing insert relative to said bushing member.

8. The apparatus of claim 6, wherein said bushing member has three runner extensions formed in said flat surface of said bottom end, and said bushing insert has three runner extensions formed in said flat surface of said bottom side.

9. Apparatus, comprising:

(a) a relatively fixed member having a top end, a bottom end and a central aperture between said top and said bottom end, said bottom end having a flat surface which is adapted to have located therein at least two outwardly disposed injection molding runner extensions which are in communication with said central aperture;

(b) a movable member sealingly and rotatably fitting within said central aperture of said fixed member and having a top side and a bottom side, said bottom side having a flat surface lying generally in the same plane as flat surface of said bottom end when said movable member is fitted within said fixed member, said flat surface of bottom side having therein runner extension means for establishing flow communication with said runner extensions in said fixed member when said movable member is in one position relative to said fixed member and for cutting off flow communications with at least one of said runner extensions formed in said fixed member when said movable member is in a second position relative to said fixed member; and (c) means carried by at least one of said members for establishing a plurality of predetermined relative positions of said fixed member relative to said movable member by using a spring loaded member which is adapted to move in a direction parallel to the axis of rotation of said movable member, said predetermined positions including said first position and said second position.

10. In an injection molding system having two mold halves which have two opposite flat faces and which cooperate together to form at least one cavity which is in flow communication with a supply runner formed in at least one of the flat faces of the mold halves, at least one of the mold halves having located therein a bored section having an outer end and an opposite inner end which is located in the flat face of the one mold half and having a bore which extends between the outer end and the inner end, apparatus for directing the flow of plastic to the cavity, comprising:

(a) a bore insert sealingly and rotatably fitting within the bore and having a flat inner side and an outer side, the bore being located in the one mold half to form a gap in the supply runner, the surface of said flat inner side being suitable for forming therein means for establishing flow communication across said gap in the supply runner when said bore insert is in one position relative to the bored section; and (b) indexing means, carried by the one mold half, for establishing a plurality of predetermined relative positions of said bore insert relative to the one mold half, said predetermined positions including said one position.

11. The apparatus of claim 10, wherein a removal port extends between said inner side and said outer side of said bore insert.

12. The apparatus of claim 10, wherein said surface of said flat inner side of said bore insert has located therein means for establishing flow communication across said gap when said bore insert is in said one position relative to the bored section.

13. The apparatus of claim 10, wherein there are two cavities in the mold halves, each of said cavities being in flow communication with a distribution runner which is formed in at least one of the flat faces of the mold halves and which is joined to a common supply runner at a node; wherein the bore in the bored section is generally centered at said common node, whereby three runner ends are formed in the inner end of the bored section, said runner ends being in flow communication with the bore;

wherein said insert has located therein runner extension means for establishing flow communication between said supply runner and the distribution runner joined to one cavity when said insert is in said one position, and for establishing flow communication between said supply runner and the distribution runner joined to the other cavity when said insert is in a second position relative to the bored section, and for establishing flow communication between said supply runner and to the distribution runners joined to both cavities when said insert is in a third position relative to the bored section; and wherein said predetermined positions of said indexing means includes said second and third positions.

14. The apparatus of claim 10, wherein said indexing means comprises:

an annular ring adapted to be carried by the bored section of the one mold half and having therein a plurality of depressions which are aligned to receive a protrusion which is carried by said bore insert and which projects parallel to the axis of rotation of said bore insert, whereby a plurality of predetermined relative positions of the bore insert relative to the one mold half are defined, said predetermined positions including said one position.

15. In an injection molding system having two mold halves which have two opposite flat faces and which cooperate together to form at least one cavity which is in flow communication with a runner through which plastic is supplied to the cavity, indexing means comprising:

an annular ring which is adapted to be carried by the seating surface of a counterbore which is located in one mold half at a location intermediate the ends of the runner so as to form a gap in the runner, said seating surface being located intermediate the ends of the counterbore and generally parallel to the flat faces of the mold, said counterbore being adapted to receive sealingly and rotatably therein an insert member which has at least one protrusion which projects into said seating surface and which has at least one runner extension means for bridging the gap in the runner when the insert is rotated to one position, said ring having a plurality of depressions which are aligned to receive the protrusion of the insert member and which are located around the circumference of said ring, whereby a plurality of predetermined positions of the insert member relative to the one mold half is defined, said predetermined positions including said one position.

16. The indexing means of claim 15, wherein there are at least two cavities in the mold halves and each cavity has a runner which is formed in at least one of the flat faces and which joins a common supply runner at a node; wherein the counterbore is centered at said node whereby at least three runner ends are formed in the gaps formed by the counterbore, said runner ends being in flow communication with the counterbore; wherein the flat bottom side of the insert has therein runner extension means for establishing flow communication from said supply runner and to the runner joined to one cavity when the insert is in said one position and to the runner joined to the other cavity when the insert is in a second position relative to the bored section and to the runners joined to each cavity when the insert is in a third position relative to the bored section and; and wherein said predetermined positions of said ring includes said second and third positions.

17. Apparatus, comprising:

(a) a base member which is adapted to be carried by an injection mold and which has an outside end, an opposite and generally flat surfaced inside end and a generally centrally located aperture between said inside end and said outside end; and (b) a switch member fitting within said centrally located aperture of said base member and having a outer side and an opposite and generally flat inner side, said flat surfaced inner side lying generally in the same plane as said flat inside end of said base member when said switch member is fitted within said base member, said flat inner side and said surface of said flat inside end having formed therein runner extension means for establishing flow communication between the ends of least two runners in said mold when said switch member is rotated to one position relative to said base member and for cutting off flow communication between said at least two runners when said switch member is rotated to a second position relative to said base member.

18. The apparatus of claim 17, wherein said runner extension means comprises at least two outwardly disposed runner extensions which are formed in said flat inside end of said base member and which are in flow communication with said centrally located aperture, said runner extensions being adapted to join to runners in said mold.

19. The apparatus of claim 17, wherein said mold comprises two mold halves; wherein said two runners are located in at least one mold half and said base member is located in at least the other mold half.

20. THe apparatus of claim 17, wherein mold comprises two mold halves and said runners are located in one mold half; wherein said base member and said base member are carried by the other mold half.

21. The apparatus of claim 17, wherein said switch member and said base member are generally cylindrical.

22. The apparatus of claim 17, further including: indexing means carried by at least one of said members for establishing a plurality of predetermined relative positions of said base member relative to said switch member, said predetermined positions including said first position and said second position, said indexing means comprising a movable projection which is constrained to move towards and away from said flat inside end of said base member.

23. The apparatus of claim 22, wherein said indexing means comprises an annular ring which is carried by said base member and which has therein a plurality of peripheral axial depressions which are aligned to receive said movable projection, said projection being carried by said switch member, whereby a plurality of predetermined relative positions of the switch member relative to said base member are defined.

24. The apparatus of claim 22, wherein said indexing means comprises means for forming a plurality of recesses in one of said members, and wherein said projection is carried by the other of said member, said projection being adapted to fit in at least one of said recesses.

25. Apparatus, comprising:
 (a) a base member which is adapted to be carried by an injection mold half and which has an outside end, an opposite and generally flat inside end and an aperture between said outside end and said inside end; and
 (b) a switch member adapted to fit within said aperture of said base member and having a outer side and an opposite and generally flat inner side, said flat inner side lying generally in the same plane as said flat inside end of said base member when said switch member is fitted within said base member, the surface of said flat inner side and the surface of said flat inside end being adapted to have at least one runner extension means formed therein for establishing flow communication between the ends of least two runners in said mold half when said switch member is in one position relative to said base member and for cutting off flow communication between said two runners when said switch member is in a second position relative to said base member.

26. The apparatus of claim 25, further including: indexing means carried by at least one of said members for establishing a plurality of predetermined relative positions of said base member relative to said switch member, said predetermined positions including said first position and said second position, said indexing means comprising means for spring loading a member to move in a direction perpendicular to said flat inside end.

27. Apparatus, comprising:
 a switch member rotatably fitting within a bore formed in an injection mold half having a flat inside surface, said switch member having a outer side and an opposite flat inner side, said flat inner side lying generally in the same plane as said flat inside surface of said mold half when said switch member is fitted within said mold half, said flat inner side having a surface which is adapted to have formed therein means for establishing flow communication between the ends of least two runners which are formed in said flat inside surface of said mold half when said switch member is in one position relative to said mold half and for cutting off flow communication between said two runners when said switch member is in a second position relative to said mold half.

28. The apparatus of claim 27, further including: indexing means carried by at least one of said members for establishing a plurality of predetermined relative positions of said base member relative to said switch member, said predetermined positions including said first position and said second position, said indexing means comprising a spring loaded member which is construed to move parallel to the axis of rotation of said switch member.

29. In an injection molding system having two mold halves cooperate together to form at least one cavity which is in flow communication with a runner through which plastic is supplied to the cavity, each of the mold halves having a flat mating surface and the runner being formed in at least one mating surface, at least one of the mold halves having therein a counterbore which is adapted to receive sealingly and rotatably therein an insert member and which defines a generally flat seating surface which is located intermediate the ends of the counterbore, the insert member having a top side and a bottom side and having a generally flat intermediate surface which is located opposite the seating surface of the counterbore which is located in the one mold half, the bottom side of the insert member having a flat surface, indexing means for establishing a plurality of predetermined positions of the insert member relative to the mold halves comprising:
 an annular ring which is adapted to be carried in a fixed position by the flat intermediate surface of the insert member and which has a flat surface lying opposite to said seating surface of the counterbore, the seating surface of the counterbore having a compliant projection which projects toward said flat intermediate surface of the insert member, the counterbore being located intermediate the ends of the runner and forming a gap in the runner, the flat bottom surface of the insert member having formed therein at least one runner extension means for bridging said gap in the runner when the insert member is in one position relative to the one mold half, said flat surface of said ring having at least one recess which is aligned to receive said compliant projection of the insert member when the insert member is located in said one position relative to the one mold half.

* * * * *